R. F. RUNGE.
CHUCK.
APPLICATION FILED APR. 25, 1919.
1,401,192.
Patented Dec. 27, 1921.
2 SHEETS—SHEET 1.
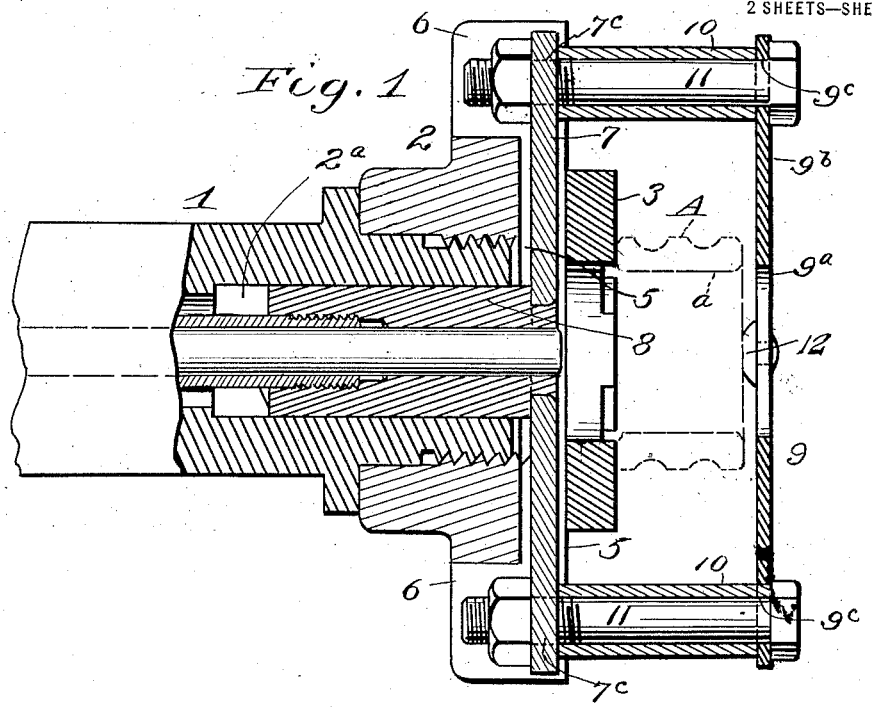
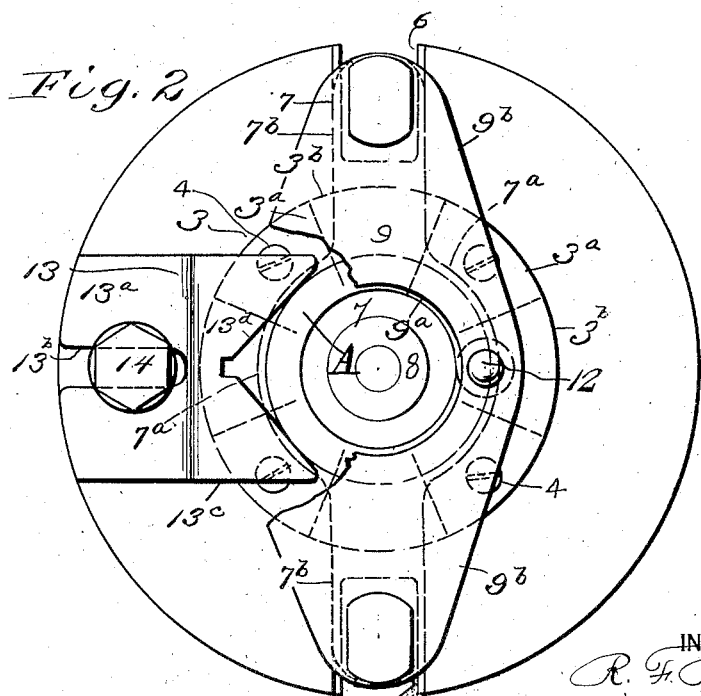
INVENTOR
R. F. Runge
BY
Rogers, Kennedy & Campbell
ATTORNEYS.

R. F. RUNGE.
CHUCK.
APPLICATION FILED APR. 25, 1919.
1,401,192.
Patented Dec. 27, 1921.
2 SHEETS—SHEET 2.
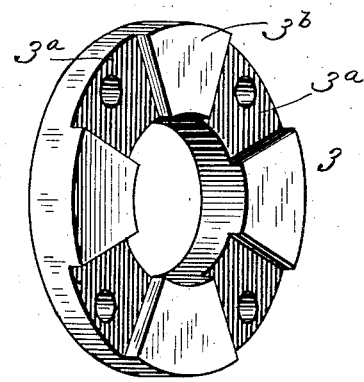
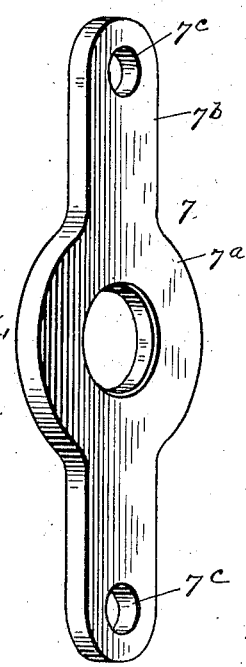
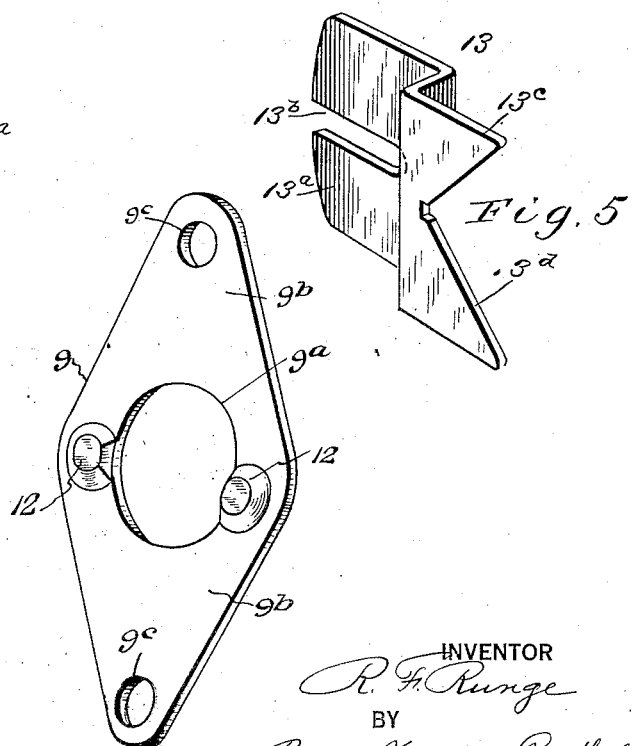
INVENTOR
R. F. Runge
BY
Rogers, Kennedy & Campbell
ATTORNEYS

UNITED STATES PATENT OFFICE.

ROBERT F. RUNGE, OF PHILADELPHIA, PENNSYLVANIA, ASSIGNOR TO THE HESS-BRIGHT MANUFACTURING COMPANY, A CORPORATION OF DELAWARE.

CHUCK.

1,401,192. Specification of Letters Patent. Patented Dec. 27, 1921.

Application filed April 25, 1919. Serial No. 292,630.

*To all whom it may concern:*

Be it known that I, ROBERT F. RUNGE, a citizen of the United States, residing at Philadelphia, in the county of Philadelphia and State of Pennsylvania, have invented certain new and useful Improvements in Chucks, of which the following is a specification, reference being had therein to the accompanying drawing.

This invention relates to chucks of the type in which the work is clamped to the head of the chuck by externally acting clamping means, and the invention has special reference to a form of clamping means which will hold the work against the chuck head so that machining or other operations may be performed on the interior or bore of a work piece of annular or ring-like form. The invention consists of various improved features of construction in chucks of this type directed more particularly to the form and arrangement of the work clamping means, the form and arrangement of the work seat, and to other features of improvement which will be fully described in the specification to follow, and the novel parts of which will be set forth in the appended claims.

In the accompanying drawings:

Figure 1 is a longitudinal section through a chuck having my invention embodied therein and showing in dotted lines the work piece held in place.

Fig. 2 is a front elevation of the same.

Fig. 3 is a perspective view of the work seat removed from the chuck body.

Fig. 4 is an elevation of the actuating plate for operating the clamping plate.

Fig. 5 is a perspective view of the gage or work locating plate.

Fig. 6 is a perspective view of the work clamping plate removed from the chuck.

Referring to the drawings:

1 designates a chuck spindle adapted to be mounted in an appropriate manner for rotation, and being in the present instance of hollow or tubular form, and 2 designates a chuck body or head fixed to the end of the spindle and formed with a central opening $2^a$ communicating with the interior of the spindle. 3 designates a work seat applied to the face of the chuck body and comprising an annular seat plate as shown in Fig. 3, which is flat on its rear face where it seats against the face of the chuck body, and which contains in its front face a series of radial recesses $3^a$ and intervening elevated flat surfaces $3^b$, which latter are flush with each other and conjointly form a seating surface for the annular work piece A, shown by dotted lines in Fig. 1. The seat plate is fastened removably in place around the central opening in the chuck body by means of fastening screws 4 extending through the recessed portions of the seat plate and into the chuck body, the heads of the screws being thus below the level of the seating surface. The work seat plate by being thus removably applied to the chuck body may be detached therefrom and replaced by other plates of different thicknesses or size to accommodate work pieces differing in thickness or size as will be presently described.

The front face of the chuck body is formed with a recess or cavity 5 extending diametrically across the same in rear of the work seat plate, the opposite ends of which cavity extend rearwardly through the chuck head as at 6, and in this cavity an actuating plate 7 extends. This plate is in the form shown more particularly in Fig. 4, and consists of a central circular body portion $7^a$ and two radial arms $7^b$ extending therefrom in diametrically opposite directions in the cavity 5, the body portion of the plate being connected with the forward end of an operating member 8 in the form of a draw tube extending within the hollow chuck spindle. This draw tube is movable as usual endwise back and forth within the spindle, such movement shifting the actuating plate 7 backwardly and forwardly in the cavity in the chuck head. The rearward movement of the tube may be effected in any suitable manner either by hand, or for instance by spring operating means to cause the work piece to be held with spring pressure, as disclosed in an application for patent filed by me conjointly with H. W. Jackson on the 27th day of July, 1917, Serial No. 183,029, but as such means form no part of the present invention it will not be necessary to describe the same herein.

9 designates a work clamping member, in the present instance in the form of a plate which extends across and in front of the work seat so as to overlie the same some distance therefrom, and the clamping plate is connected with the actuating plate so that in the movements of the latter, the clamping plate will be moved with it to and from the work seat to respectively clamp and release the work seat. As shown more particularly in Fig. 6, this clamping plate comprises a central body portion containing a central opening 9ª, and two arms 9ᵇ extending radially from the body portion in diametrically opposite directions. At their outer ends, the arms 9ᵇ are provided with holes 9ᶜ which aline with holes 7ᶜ in the outer ends of the arms of the actuating plate, hollow spacing spools or posts 10 being disposed between the ends of the arms to space the two plates from each other, and through bolts 11 being extended through the holes in the arms and the intervening spools, and being provided on their outer ends with heads bearing against the outer sides of the arms 9ᵇ, and on their inner ends with nuts adapted to screw up against the rear sides of the arms 7ᵇ, by which arrangement of the parts the clamping plate is removably connected in spaced relation to the actuating plate, as shown in Fig. 1.

The clamping plate is comparatively thin, and when connected with the actuating plate as above described, possesses some degree of resiliency or spring, so that when drawn inwardly against the work piece, it will act on the same and bind it against the work seat and hold it with yielding pressure of sufficient force to enable the work to be subjected to the desired machining or other operations. The contact of the clamping plate with the work piece is confined to two diametrically opposite points on the work piece, and is effected in the present instance by two pressure lugs or buttons 12 riveted to the inner side of the central body portion of the clamping plate on opposite sides of the central opening therein, in such position that when the clamping plate is moved rearwardly toward the work seat, these buttons will engage the outer ends of the work piece and will bind the same against the work seat.

In order to facilitate the seating of the work piece in position to be clamped by the clamping plate, I propose to provide a gage or locating plate 13 which is applied to the front face of the chuck body in position to be engaged by the outside diameter of the work piece when the latter is seated on the work seat. In the present instance, this gage plate consists of a lower flat body portion 13ª, which is slotted as at 13ᵇ and adjustably secured to the face of the chuck body by a fastening bolt 14, and an elevated portion or gage plate proper 13ᶜ connected with the body portion and extending some distance inward over and in close proximity to the seating surface of the seat plate, the gage plate proper being provided with a V-notch 13ᵈ, in which the work piece will extend and engage the sides of the notch and assume its proper position on the work seat.

In the operation of the chuck, the draw tube is thrust forwardly to move the clamping plate away from the work seat, and the work piece A, in this instance the inner bearing ring of an anti-friction bearing whose bore a is to be subjected to the machining or grinding operation, is then inserted from the side into the space between the clamping plate and the work seat, and is pushed across the latter until it brings up in the V-notch in the gage plate. The relation and the size of the parts is such that when the work piece is thus located in position by the gage plate, the opposite sides of the outer end of the work piece will be directly in line with the pressure buttons on the clamping plate. The draw tube is now retracted, and pulling the clamping plate rearwardly, the pressure buttons will engage and clamp the work piece firmly against the work seat, and the work will be held with its bore exposed so that the operating tool may be entered therein through the central opening in the clamping plate.

From the construction described, it will be understood that work pieces of different sizes and thicknesses may be accommodated by employing work seat plates of different thicknesses, and spacing spools of different lengths to vary the distance between the clamping plate and work seat. Also it will be understood that by reason of the resilient or spring character of the clamping plate, the latter will automatically adjust itself to work pieces of different thicknesses without the necessity of substituting spacing spools of different lengths, the resiliency of the plate thus compensating for variations in the thickness of work pieces within certain limits. A further advantage of the resiliency of the clamping plate is that it tends to equalize the pressure of the two buttons 12 on the work piece.

By providing the work seat plate with the recesses and intervening elevated surfaces, a more uniform contact of the work piece with the seating surface is secured, and these surfaces may be readily freed from such foreign matter or particles as may adhere to them, by wiping the same off into the recesses.

Work seats may be employed of different diameters, depending upon the bore of the ring to be ground, and each seat will of course take in a series of different sizes of work pieces, not only of different bore dimensions but also of different thicknesses, and the difference in thickness is compensated for by inserting spacing spools of different lengths.

In the foregoing description and accompanying drawings I have set forth my invention in the particular detailed form and construction which I prefer to adopt and which in practice has been found to answer to a satisfactory degree the ends to be attained. It will be manifest, however, that these details may be variously changed by the skilled mechanic without departing from the limits of the invention, and it will be understood that the invention is not limited to any particular form or construction of the parts, except in so far as such limitations are specified in the claims.

Having thus described my invention, what I claim is:

1. In a chuck, the combination of a chuck body provided with a work seat, a work clamping plate extending across the work seat in front of the same, an actuating plate for the clamping plate fixedly connected thereto at opposite sides and movable freely relatively to the chuck body to and fro axially of the chuck in a rectilinear path, and means sustained by and movable relatively to the chuck body and connected with the actuating plate for moving the same to and fro.

2. In a chuck, the combination of a chuck body provided with a work seat, a work clamping plate extending across the work seat in front of the same, an actuating member for the clamping plate movable to and fro in rear of the work seat and to which the clamping plate is secured at opposite sides, and a movable operating member sustained by the chuck body and connected with the actuating member to move the same to and fro.

3. In a chuck, the combination of a chuck body provided with a work seat, a work clamping plate extending across the seat in front of the same, an actuating member for the clamping plate in the form of a plate extending parallel with the clamping plate in rear of the work seat and connected to the clamping plate in spaced relation to the same, said actuating member being movable to and fro, and means for operating the actuating member.

4. In a chuck, the combination of a chuck body provided with a work seat, a work clamping plate extending across the work seat in front of the same, an actuating member for the clamping plate movable to and fro, and removable connecting devices for connecting the work clamping plate fixedly to the actuating member in spaced relation to the same.

5. In a chuck, the combination of a chuck body provided with a work seat, a clamping plate extending across the work seat in front of the same, an actuating member for the clamping plate movable to and fro, spacing spools between the actuating member and clamping plate and removable through bolts extending through said parts and acting to hold them detachably in fixed relations.

6. In a chuck, the combination of a chuck body provided with a work seat, a work clamping plate extending across the work seat, an actuating member for the clamping plate connected thereto at points separated from each other and movable relatively to the chuck body axially thereof to move the clamping plate to and from the work seat, and pressure buttons fixed to the clamping plate at points on opposite sides of a line connecting the points of connection of the actuating member with the clamping plate, said pressure buttons being in position to engage the work when the clamping plate is moved toward the work seat.

7. In a chuck, the combination of a chuck body, a plate applied to the chuck body and provided with a work seat plate having a work seat, and a gage plate applied to the chuck body at the side of the work seat plate, and having a portion overlying the same at one side only in position to be engaged by the work when positioned on the work seat, and means for clamping the work on the work seat.

8. In a chuck, the combination of a chuck body, a seat plate applied thereto and provided with a work seat, a gage plate applied to the chuck body at the side of the seat plate and provided with an extended portion overlying the same, said extended portion having a V-notch therein in position to receive the side of the work when positioned on the work seat, and means for clamping the work on the work seat.

In testimony whereof, I have affixed my signature hereto.

ROBERT F. RUNGE.